March 5, 1946.     J. S. PITISCI     2,396,124
SEALED BEARING LUBRICATOR
Filed April 1, 1943     2 Sheets-Sheet 1
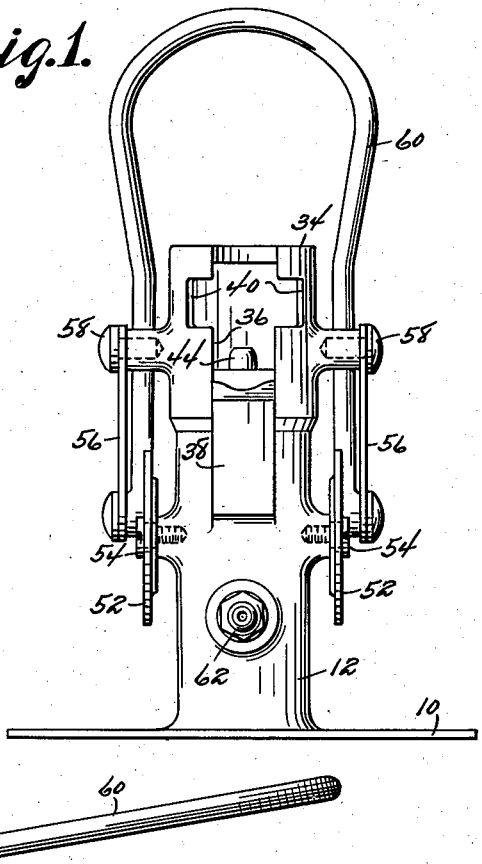
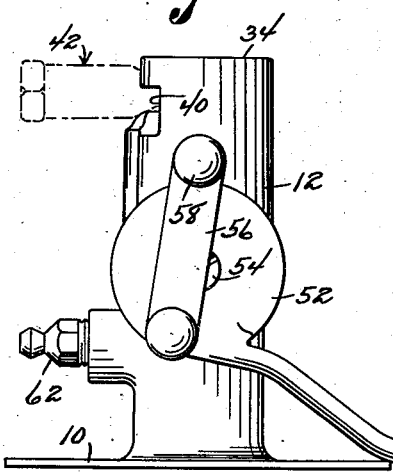
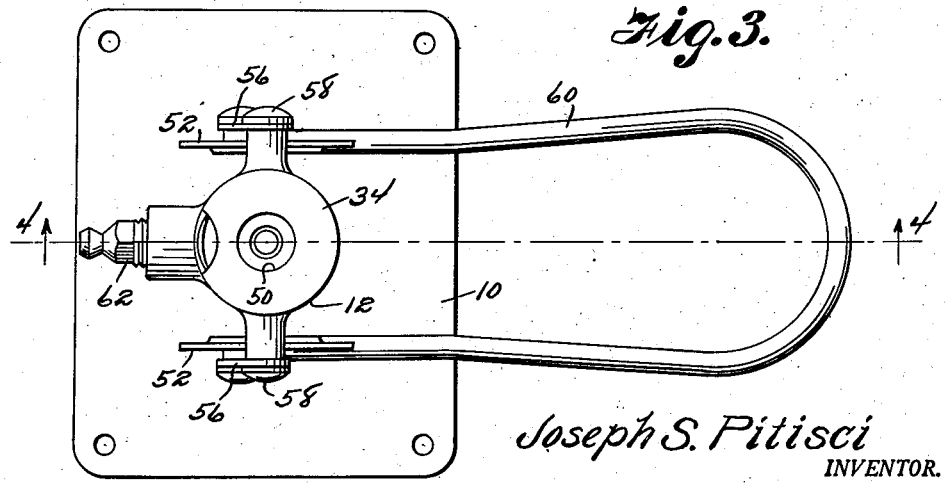
Joseph S. Pitisci
INVENTOR.
BY
Victor J. Evans & Co.
ATTORNEYS March 5, 1946. J. S. PITISCI 2,396,124
SEALED BEARING LUBRICATOR
Filed April 1, 1943 2 Sheets-Sheet 2
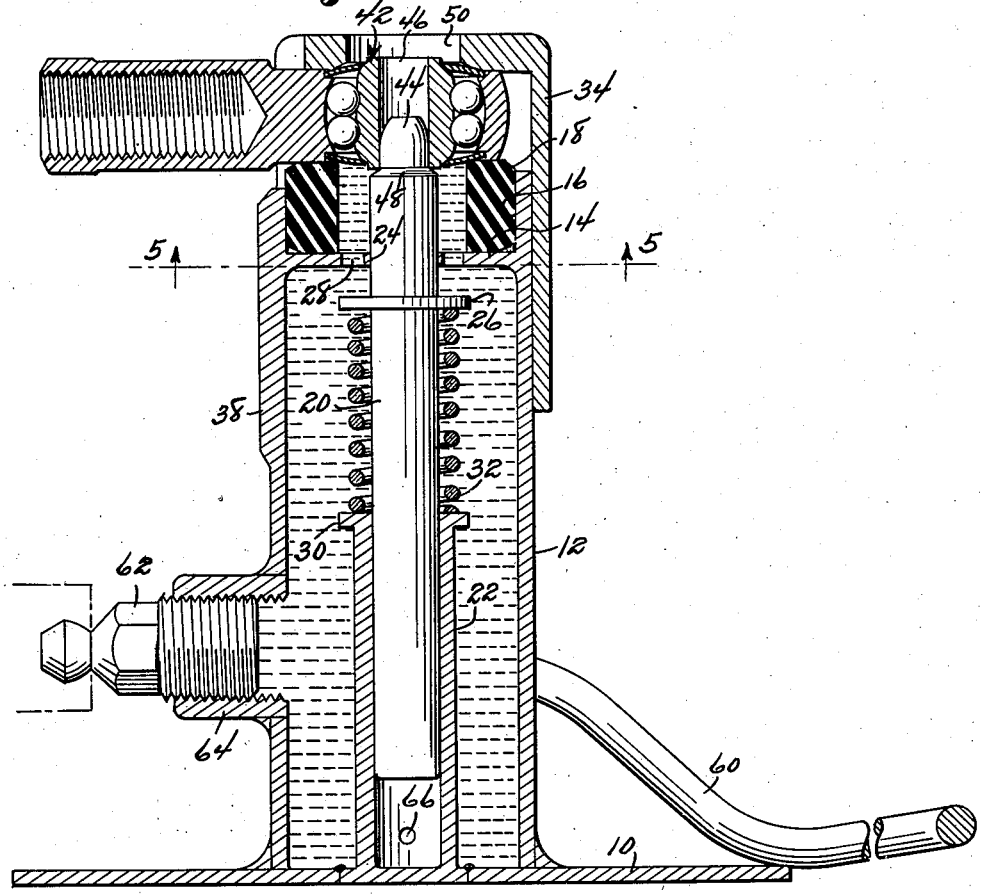
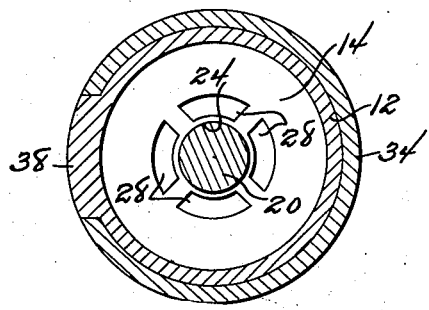
Joseph S. Pitisci
INVENTOR.
BY
Victor J. Evans & Co.
ATTORNEYS Patented Mar. 5, 1946

2,396,124

UNITED STATES PATENT OFFICE 2,396,124

SEALED BEARING LUBRICATOR

Joseph S. Pitisci, Miami Springs, Fla.

Application April 1, 1943, Serial No. 481,469

7 Claims. (Cl. 184—1).

My invention relates to the lubrication of bearings, particularly control rod end bearings such as are employed in aircraft, and has among its objects and advantages the provision of an improved sealed bearing lubricator.

In the accompanying drawings:

Figure 1 is a front elevational view of a lubricator in accordance with my invention.

Figure 2 is a side view.

Figure 3 is a top view.

Figure 4 is an enlarged sectional view along the line 4—4 of Figure 3, and

Figure 5 is a sectional view along the line 5—5 of Figure 4.

In the embodiment of the invention selected for illustration, I make use of a base plate 10 having an upstanding tubular shell 12 welded thereto. This shell is provided with a horizontal flange 14 located a short distance inwardly of the upper end of the shell to provide a cup 16 for a resilient body or bushing 18. A valve stem 20 is slidably guided in a tube 22 arranged concentrically inside the shell 12 and attached to the base plate. This stem is slidably guided in an opening 24 in the flange 14 and is provided with a valve flange 26 normally engaging the lower face of the flange 14 to close lubricant passages 28 therein. However, the lubricant may be delivered to the bore of the bushing 18 by pressing the stem downwardly to space the flange 26 from the flange 14.

A flange 30 is formed at the upper end of the tube 22 to constitute a rest for a compression spring 32 having its other end abutting the flange 26 to yieldingly hold the stem 20 in its closed position with respect to the openings 28. Slidably mounted on the shell 12 is a cap 34 having a slot 36 for receiving a key 38 on the shell 12 to restrain the cap from rotation but permitting longitudinal movement thereof relatively to the shell. The slot 36 terminates in recesses 40 aligned to provide an opening in the side wall of the cap for the introduction of the control rod end bearing 42. A tapered centering pin 44 is formed at the upper end of the stem 20 to enter the bearing race 46 and position the bearing coaxially on the resilient bushing 18. This centering pin terminates in an abrupt taper 48 engageable with the end of the bearing bushing 46 to constitute a closure therefor.

An opening 50 is formed in the top wall of the cap 34 coaxially with the stem 20 to provide accommodation for the bearing bushing 46 and an ezit for lubricant pressed through the bearing 42. Two plates 52 are rotatably mounted on screws 54 threaded into the shell 12. A link 56 is pivotally connected with each plate 52 to one side of the screw 54. The other ends of the links are pivotally connected at 58 with the cup 34. To the plates 52 is fixedly attached a U-shaped handle 60 to facilitate rotation of the plates 52 in unison and actuate the links 56 to thereby impart sliding movement to the cap 34 relatively to the shell. For lubricating purposes, the control rod end bearing is inserted inside the cap 34 and the latter is pressed down on the bearing through actuation of the handle 60. Normally the cap 34 is elevated to such an extent as to provide clearance for the bearing with respect to the centering pin 44. The cap 34 is moved downwardly sufficiently far to press the bearing firmly against the resilient bushing 18, which at the same time presses the stem 20 downwardly so that lubricant may pass from the shell 12 through the bushing 18 and into the bearing 42.

A Zerk fitting 62 is provided for connection with a grease gun. This fitting is threaded into a flange 64 on the shell 12 so that lubricant passing through the fitting is admitted to the shell under pressure to force lubricant through the bearing. Lubricant passing through the bearing escapes through the opening 50, pushing before it all dirt and old grease that may remain in the bearing. Forced lubrication is stopped as soon as clean grease escapes through the opening 50.

The tube 22 is perforated at 66 to permit free movement of the stem 20.

Figure 2 illustrates the position of the handle 60 when the bearing 42 is clamped in the lubricator. When in this position, a straight line extending through the axes of the links 56 lies to one side of the common axis of the two plates 52 to lock the cap 34 in its clamping position. The handle 60 lies at rest on the base plate 10, which handle is held firmly thereagainst by reason of the resilient bushing 18.

While the lubricator has been described in connection with an aircraft control rod end bearing, the lubricator is equally well adapted for use in connection with other types of bearings.

Without further elaboration, the foregoing will so fully explain my invention, that others may, by applying current knowledge, readily adapt the same for use under various conditions of service.

I claim:

1. A sealed bearing lubricator comprising a shell having an inlet for the introduction of lubricant under pressure, a bearing support, means for pressing the bearing against said support, and a valve means opened through engagement with said bearing to pass lubricant from the shell into the bearing.

2. A bearing lubricator comprising a shell having an inlet for the introduction of lubricant under pressure, a resilient bearing support, means for pressing the bearing against said support, a valve means opened through engagement with said bearing when pressed against said support to pass lubricant from the shell into the bearing, and means on said valve means for locating the bearing on said resilient support.

3. A bearing lubricator comprising a shell having an inlet for the introduction of lubricant under pressure, a resilient bearing support, means for pressing the bearing against said bearing support, said shell being provided with openings, valve means normally closing said openings but being moved to an uncovering position through engagement with said bearing to pass lubricant from the shell into the bearing, means yieldingly holding said valve means in its covering position, and means on said valve means for centering the bearing on said bearing support.

4. The invention described in claim 1 wherein said valve means includes a lubricant passage in said shell, and a valve element yieldingly biased to a normal position for covering said lubricant passage.

5. A lubricator for aircraft control rod end bearings, comprising a shell having an inlet for the introduction of lubricant under pressure, said shell being provided with a perforated wall, a resilient bearing engaging bushing mounted on said wall with the perforation in the wall communicating with the opening through the bushing, a valve stem slidably guided in said shell and having a flange normally engaging said wall to close the perforation therein, resilient means yieldingly holding said flange against said wall, a centering pin on said valve stem engageable with the bearing to center the latter on said bushing, a cap engageable with the bearing to press the latter against said bushing, and means for actuating said cap.

6. The invention described in claim 5 wherein said cap is slidably mounted on said shell, means for keying the cap against rotation on the shell but permitting relative movement longitudinally of the axis of said valve stem, said second mentioned means comprising links pivotally connected with said cap, rotatable members mounted on said shell, and a handle connected with said rotatable members, a base on said shell, said handle being movable into engagement with said base with said rotatable members so positioned as to transmit compression forces from said bushing to the handle for yieldingly holding the latter against the base.

7. In a device of the character described, a hollow body having a lubricating supply inlet, a support mounted on said body and in communication with said body means for holding an article to be lubricated on the support, a valve controlling the communication between the body and the support, and means operated by the article on the support for opening said valve.

JOSEPH S. PITISCI.